W. REAGAN.
ANTISKIDDING AND TRACTION DEVICE FOR AUTOMOBILE WHEELS.
APPLICATION FILED FEB. 17, 1910.
968,415.
Patented Aug. 23, 1910.
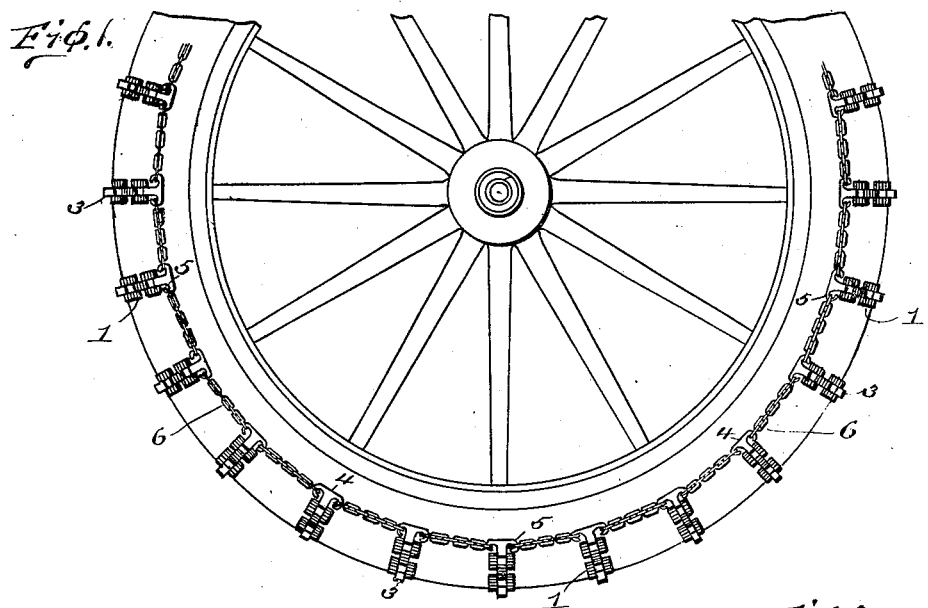
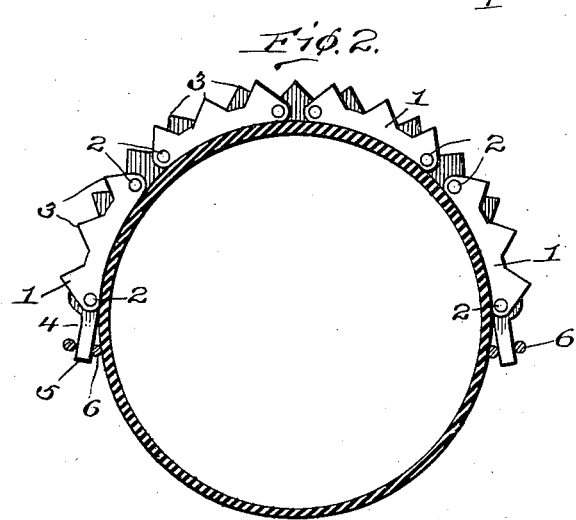
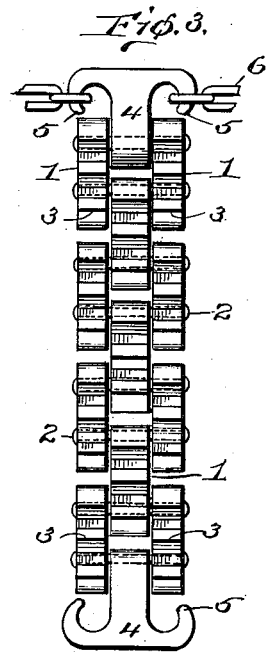
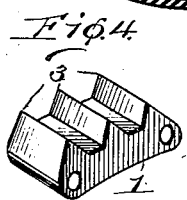
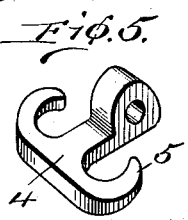

UNITED STATES PATENT OFFICE.

WILLIAM REAGAN, OF PHILADELPHIA, PENNSYLVANIA.

ANTISKIDDING AND TRACTION DEVICE FOR AUTOMOBILE-WHEELS.

968,415. Specification of Letters Patent. Patented Aug. 23, 1910.

Application filed February 17, 1910. Serial No. 544,416.

*To all whom it may concern:*

Be it known that I, WILLIAM REAGAN, citizen of the United States, residing at Philadelphia, in the county of Philadelphia and State of Pennsylvania, have invented certain new and useful Improvements in Antiskidding and Traction Devices for Automobile-Wheels; and I do hereby declare the following to be a full, clear, and exact description of the invention, such as will enable others skilled in the art to which it appertains to make and use the same.

The invention relates to anti-skidding and traction devices for wheels of vehicles, particularly automobile wheels, and is a species of the type of similar devices shown and described in an application filed by me February 12, 1910, Serial Number 543,583.

The invention consists of a plurality of pivoted calk-bearing sections arranged in groups, at intervals, around the circumference of the wheel, and means for holding the groups in their spaced relation, as will be hereinafter described, and stated in the claims.

One of the chief objects of the invention, is to so construct and arrange the calk-bearing sections that the calks of the intermediate sections will be in staggered relation to those lying upon either side thereof, so that they will have a "creeper" effect in their action, which will not only check any tendency to skid, but will materially assist in traction.

Other objects of the invention will become apparent upon a more complete disclosure thereof.

In the drawing:—Figure 1 is a side elevation of a section of an automobile wheel, showing my invention applied thereto; Fig. 2, a transverse section of the tire, showing a group of the devices arranged thereon; Fig. 3, a top plan view of a group of the calk-bearing sections, showing the staggered relation of the calks; Fig. 4, a perspective view of one of the sections, and Fig. 5, a similar view of the securing-block.

Referring to the several views, the numeral 1 indicates a number of metallic calk-bearing sections, arranged in a plurality of parallel rows and pivoted directly to each other by removable pins or pintles 2. Each section is slightly curved on its under surface, to conform to the lateral curvature of the tire, and provided with a plurality of sharpened calks 3, the calks of the intermediate row of sections being in staggered relation to those lying upon either side, as shown in Fig. 3. Pivoted between each of the outer end sections of each group of calk-bearing sections, is a securing-block 4 having oppositely-disposed hooks 5, to which are attached the retaining-members, preferably chains 6. These hooks are so disposed that the calk-bearing sections, to which they are pivoted, prevent the disengagement of the retaining-members or chains therefrom, but by the removal of the pintle, connecting the block to the calk-bearing sections, said members or chains may be removed from the hooks.

The pivoted calk-bearing sections are arranged, at intervals, in groups around the circumference of the wheel, the groups being held in their spaced relation by the retaining-members 6, as shown in Fig. 1.

By arranging the calk-bearing sections in the manner shown and described, the number of calks is greatly increased, thereby increasing the holding-action and materially assisting traction. As stated in the application hereinbefore referred to, this increases the disposition of certain of the calk-bearing sections at points in the lateral curved surface of the tire, which points approximately coincide with the side of the flattened load-bearing portion thereof. This is of great advantage, because the calks of those sections, lying upon the sides of the flattened portion of the tire, enter or penetrate the ground to a greater or less extent, notwithstanding they point at a certain angle of inclination. The holding-action and traction is also increased by arranging the calks in staggered form, as is obvious, and, by reason of their peculiar shape readily penetrate or engage the surface of the road, pavement, or ice and snow.

Having thus fully described my invention what I claim, is:—

1. An anti-skidding and traction device, having in combination a plurality of rows of calk-bearing sections pivoted directly to each other, and calk-bearing section retaining members, the calk-bearing sections being flexibly connected to the retaining members, and the calks of the intervening row of sections staggered in relation to the outer rows.

2. An anti-skidding and traction device, having in combination a plurality of rows of calk-bearing sections pivoted directly to each other, a securing-block pivoted between each of the outer end sections, said securing-blocks being provided with hooks, and retaining-members connected with said hooks, the calk-bearing sections being flexibly connected to the retaining-members, and the calks of the intervening row of sections staggered in relation to the outer rows.

In testimony whereof I affix my signature, in the presence of two witnesses.

WILLIAM REAGAN.

Witnesses:
WILLIAM SHERMER,
J. W. CASSIDY.